US008348769B2

(12) United States Patent
Greenberg et al.

(10) Patent No.: US 8,348,769 B2
(45) Date of Patent: Jan. 8, 2013

(54) WAGERING GAME MACHINE WITH A TOOLLESS HARD DRIVE MOUNT

(75) Inventors: Jacob C. Greenberg, Elgin, IL (US); Raymond E. Macika, Wilmette, IL (US); Victor Mercado, Berwyn, IL (US); Eleobardo Moreno, St. John, IL (US)

(73) Assignee: WMS Gaming Inc., Waukegan, IL (US)

( * ) Notice: Subject to any disclaimer, the term of this patent is extended or adjusted under 35 U.S.C. 154(b) by 1085 days.

(21) Appl. No.: 12/293,117

(22) PCT Filed: Mar. 21, 2007

(86) PCT No.: PCT/US2007/007030

§ 371 (c)(1),
(2), (4) Date: Sep. 16, 2008

(87) PCT Pub. No.: WO2007/111906

PCT Pub. Date: Oct. 4, 2007

(65) Prior Publication Data

US 2009/0061988 A1 Mar. 5, 2009

Related U.S. Application Data

(60) Provisional application No. 60/743,634, filed on Mar. 22, 2006.

(51) Int. Cl.
*A63F 13/00* (2006.01)
*A63F 13/08* (2006.01)

(52) U.S. Cl. ................ 463/47; 463/20; 463/43; 463/46; 273/148 B; 361/726; 361/727; 455/575.1; 455/575.4; 312/223.1; 312/223.2; 312/333

(58) Field of Classification Search .................... 463/20, 463/36, 38, 43, 46–47, 53, 56; 273/148 B, 273/150, 329–330, 406–407; 345/169; 361/679.55, 361/679.56, 679.59, 679.08, 679.09, 679.11, 361/685, 683, 724–727; 379/433.12, 433.13; 700/66, 168, 214; 455/90.3, 556.1, 556.2, 455/575.1, 575.2, 575.3, 575.4; 360/91–93, 360/98.01, 99.06, 137, 137 B; 720/614–615, 720/633; 414/266, 269, 270, 277, 280; 312/223.1, 312/223.2, 266–268, 332.1, 333; 369/75.1, 369/82; *A63F 13/00, 13/08*

See application file for complete search history.

(56) References Cited

U.S. PATENT DOCUMENTS 6,683,785 B1 1/2004 Chen (Continued)

OTHER PUBLICATIONS

"International Application Serial No. PCT/US07/07030, International Search Report mailed Sep. 15, 2008", 2 pgs.

(Continued)

*Primary Examiner* — Arthur O. Hall
(74) *Attorney, Agent, or Firm* — Schwegman, Lundberg & Woessner, P.A.

(57) ABSTRACT

In some embodiments, an apparatus includes a printed circuit board that is part of a wagering game machine. The printed circuit board includes a processor operable to execute instructions associated with a wagering game. The printed circuit board also includes a hard drive mount that includes an alignment guide and a blind mate connector for electrically coupling a hard drive to a surface mount connection on the printed circuit board. The hard drive is to store wagering game data for the wagering game.

23 Claims, 11 Drawing Sheets

U.S. PATENT DOCUMENTS

| | | | | |
|---|---|---|---|---|
| 7,003,588 | B1 * | 2/2006 | Takeda et al. | 710/8 |
| 7,349,175 | B2 * | 3/2008 | McIntosh et al. | 360/91 |
| 7,722,468 | B2 * | 5/2010 | Cockerille et al. | 463/43 |
| 7,736,234 | B2 * | 6/2010 | Cockerille et al. | 463/43 |
| 7,993,202 | B2 * | 8/2011 | Rowe et al. | 463/42 |
| 2003/0002209 | A1 | 1/2003 | Yang | |
| 2003/0073499 | A1 * | 4/2003 | Reece | 463/42 |
| 2004/0211077 | A1 | 10/2004 | Schwichtenberg et al. | |
| 2006/0146439 | A1 | 7/2006 | McIntosh et al. | |
| 2006/0287108 | A1 * | 12/2006 | Canterbury | 463/43 |
| 2006/0287109 | A1 * | 12/2006 | Mercado et al. | 463/43 |
| 2008/0261703 | A1 * | 10/2008 | Luciano et al. | 463/46 |

OTHER PUBLICATIONS

"International Application Serial No. PCT/US07/07030, Written Opinion mailed Sep. 15, 2008", 5 pgs.

* cited by examiner

WAGERING GAME MACHINE WITH A TOOLLESS HARD DRIVE MOUNT

RELATED APPLICATION

This patent application is a U.S. National Stage Filing under 35 U.S.C. 371 from International Patent Application Serial No. PCT/US2007/007030, filed Mar. 21, 2007, and published on Oct. 4, 2007, as WO 2007/111906 A2, which claims the priority benefit of U.S. Provisional Patent Application Ser. No. 60/743,634 filed Mar. 22, 2006 and entitled "WAGERING GAME MACHINE WITH A TOOLLESS HARD DRIVE MOUNT", which applications are incorporated herein by reference.

COPYRIGHT

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2006, 2007, WMS Gaming, Inc.

FIELD

Embodiments of the inventive subject matter relate generally to wagering game machines, and more particularly, to hard drive mounts for installing of hard drives into a wagering game machine.

BACKGROUND

Wagering game makers continually provide new and entertaining games. One way of increasing entertainment value associated with casino-style wagering games (e.g., video slots, video poker, video black jack, and the like) includes offering a variety of base games and bonus events. However, despite the variety of base games and bonus events, players often lose interest in repetitive wagering gaming content. In order to maintain player interest, wagering game machine makers frequently update wagering game content with new game themes, game settings, bonus events, game software, and other electronic data.

DETAILED DESCRIPTION

Systems, apparatus and methods for hard drive mounts for installing of hard drives into a wagering game machine are described herein. This description of the embodiments is divided into three sections. The first section provides an example wagering game and operating environment that includes some embodiments of the invention. The second section describes example hard drive mounts for installing hard drives into wagering game machines. The third section provides some general comments.

Some embodiments provide for the installing and removing of a hard drive into and out from a wagering game machine without tools or fasteners. Hard drives can be installed and removed from a wagering game machine for a number of reasons. Hard drives typically fail after extended usage. Such hard drives need to be replaced. Also, if software (such as a new game, operating system, etc.) is to be installed in the wagering game machine, a new hard drive with the new software can be added to or exchanged with the current hard drive.

In some embodiments, a tool (such as a screw driver, nut driver, etc.) is not needed to secure the hard drive to a hard drive mount in the wagering game machine using fasteners (such as screws). Accordingly, some embodiments can save time. In particular, installations of the hard drives can be quicker in comparison to installations that require tools to secure the hard drives to mounts in the wagering game machine. Therefore, technicians that install and remove hard drives in a wagering game machine (both initially at the factory and in the field) can perform such operations more easily and more quickly. Moreover, because such operations can be performed more easily (not requiring a tool), the risk of failure of such hard drives is typically less.

Some embodiments also can save money. Distribution of the new software through installation of a new hard drive can affect numerous wagering game machines that are operational in the field (such as a casino). The effected wagering game machines may be required to be taken out of service. The longer the time the effected wagering game machines are out of service the more costly such operations are. Specifically, the effected wagering game machines are not collecting revenue during this out of service period. Some embodiments can significantly reduce the time of installation of new hard drives (with the new software) into the numerous wagering game machines.

Example Wagering Game

Figure 1A:
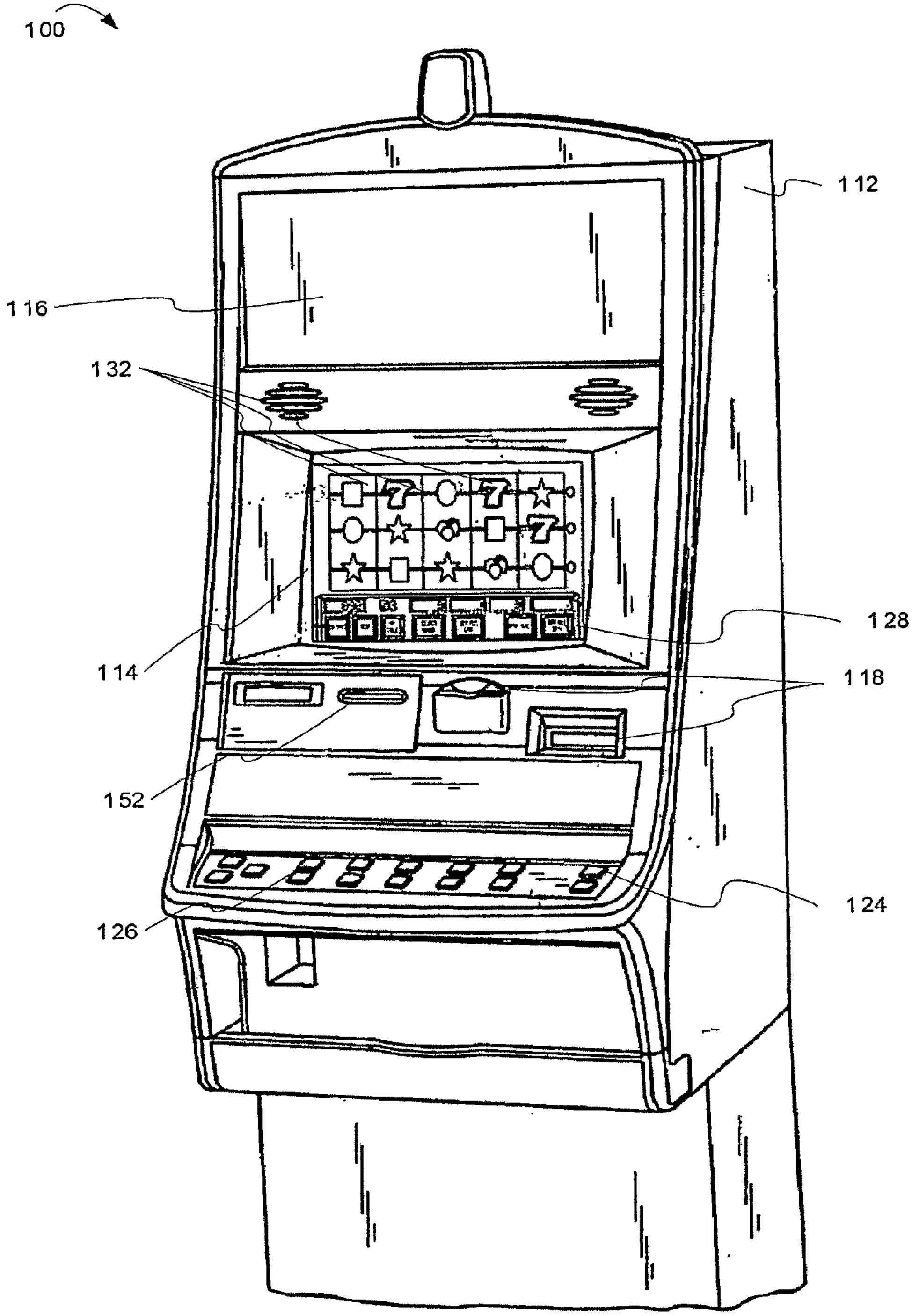
FIG. 1A is a perspective view of a front side view of a wagering game machine, according to some embodiments of the invention.

FIG. 1A is a perspective view of a front side view of a wagering game machine, according to some embodiments of the invention. Referring to FIG. 1A, a wagering game machine 100 is used in gaming establishments, such as casinos. According to embodiments, the wagering game machine 100 can be any type of wagering game machine and can have varying structures and methods of operation. For example, the wagering game machine 100 can be an electromechanical wagering game machine configured to play mechanical slots, or it can be an electronic wagering game machine configured to play video casino games, such as blackjack, slots, keno, poker, blackjack, roulette, etc.

The wagering game machine 100 comprises a housing 112 and includes input devices, including wager input devices 118 and a player input device 124. For output, the wagering game machine 100 includes a primary display 114 for displaying information about a basic wagering game. The primary display 114 can also display information about a bonus wagering game and a progressive wagering game. The wagering game machine 100 also includes a secondary display 116 for displaying wagering game events, wagering game outcomes, and/or signage information. While some components of the wagering game machine 100 are described herein, numerous other elements can exist and can be used in any number or combination to create varying forms of the wagering game machine 100.

The wager input devices 118 can take any suitable form and can be located on the front of the housing 112. The wager input devices 118 can receive currency and/or credits inserted by a player. The wager input devices 118 can include coin acceptors for receiving coin currency and bill acceptors for receiving paper currency. Additionally, the wager input devices 118 can include ticket readers or barcode scanners for reading information stored on vouchers, cards, or other tangible portable storage devices. The vouchers or cards can authorize access to central accounts, which can transfer money to the wagering game machine 100.

The player input device 124 comprises a plurality of push buttons on a button panel 126 for operating the wagering game machine 100. In addition, or alternatively, the player input device 124 can comprise a touch screen 128 mounted over the primary display 114 and/or secondary display 116.

The various components of the wagering game machine 100 can be connected directly to, or contained within, the housing 112. Alternatively, some of the wagering game machine's components can be located outside of the housing 112, while being communicatively coupled with the wagering game machine 100 using any suitable wired or wireless communication technology.

The operation of the basic wagering game can be displayed to the player on the primary display 114. The primary display 114 can also display a bonus game associated with the basic wagering game. The primary display 114 can include a cathode ray tube (CRT), a high resolution liquid crystal display (LCD), a plasma display, light emitting diodes (LEDs), or any other type of display suitable for use in the wagering game machine 100. Alternatively, the primary display 114 can include a number of mechanical reels to display the outcome. In FIG. 1, the wagering game machine 100 is an "upright" version in which the primary display 114 is oriented vertically relative to the player. Alternatively, the wagering game machine can be a "slant-top" version in which the primary display 114 is slanted at about a thirty-degree angle toward the player of the wagering game machine 100. In yet another embodiment, the wagering game machine 100 can be a bartop model, a mobile handheld model, or a workstation console model.

A player begins playing a basic wagering game by making a wager via the wager input device 118. The player can initiate play by using the player input device's buttons or touch screen 128. The basic game can include arranging a plurality of symbols along a payline 132, which indicates one or more outcomes of the basic game. Such outcomes can be randomly selected in response to player input. At least one of the outcomes, which can include any variation or combination of symbols, can trigger a bonus game.

In some embodiments, the wagering game machine 100 can also include an information reader 152, which can include a card reader, ticket reader, bar code scanner, RFID transceiver, or computer readable storage medium interface. In some embodiments, the information reader 152 can be used to award complimentary services, restore game assets, track player habits, etc.

Figure 1B:
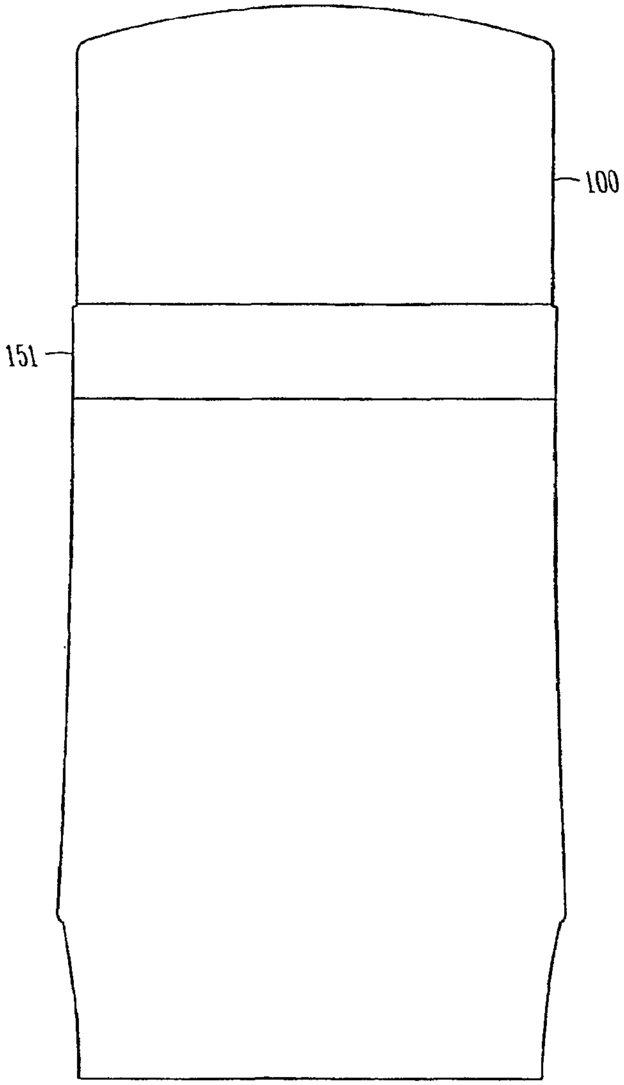
FIG. 1B is a perspective view of a back side view of a wagering game machine, according to some embodiments of the invention.
Figure 3:
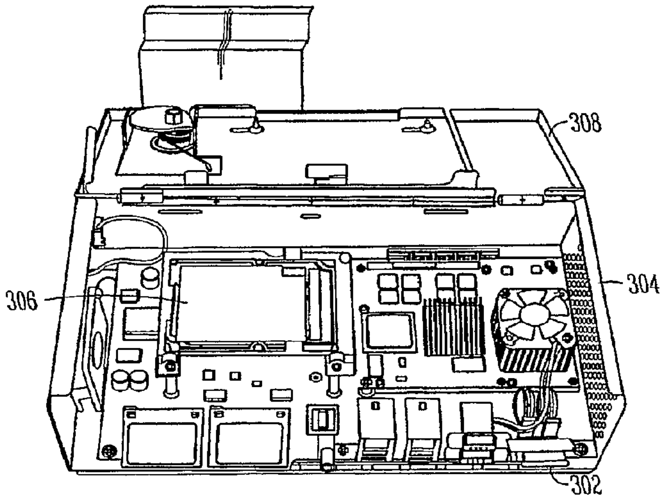
FIG. 3 illustrates a logic box that is part of a wagering game machine, according to some embodiments of the invention.

FIG. 1B is a perspective view of a back side view of a wagering game machine, according to some embodiments of the invention. As shown, in the back side, the wagering game machine 100 includes a logic box 151. The logic box 151 can house a number of electrical components for operation of the wagering game machine 100. For example, the logic box 151 can house a hard drive that is installed therein using hard drive mounts, according to some embodiments of the invention. A more detailed view of the logic box 151, according to some embodiments, is illustrated in FIG. 3, which is described in more detail below.

Figure 2:
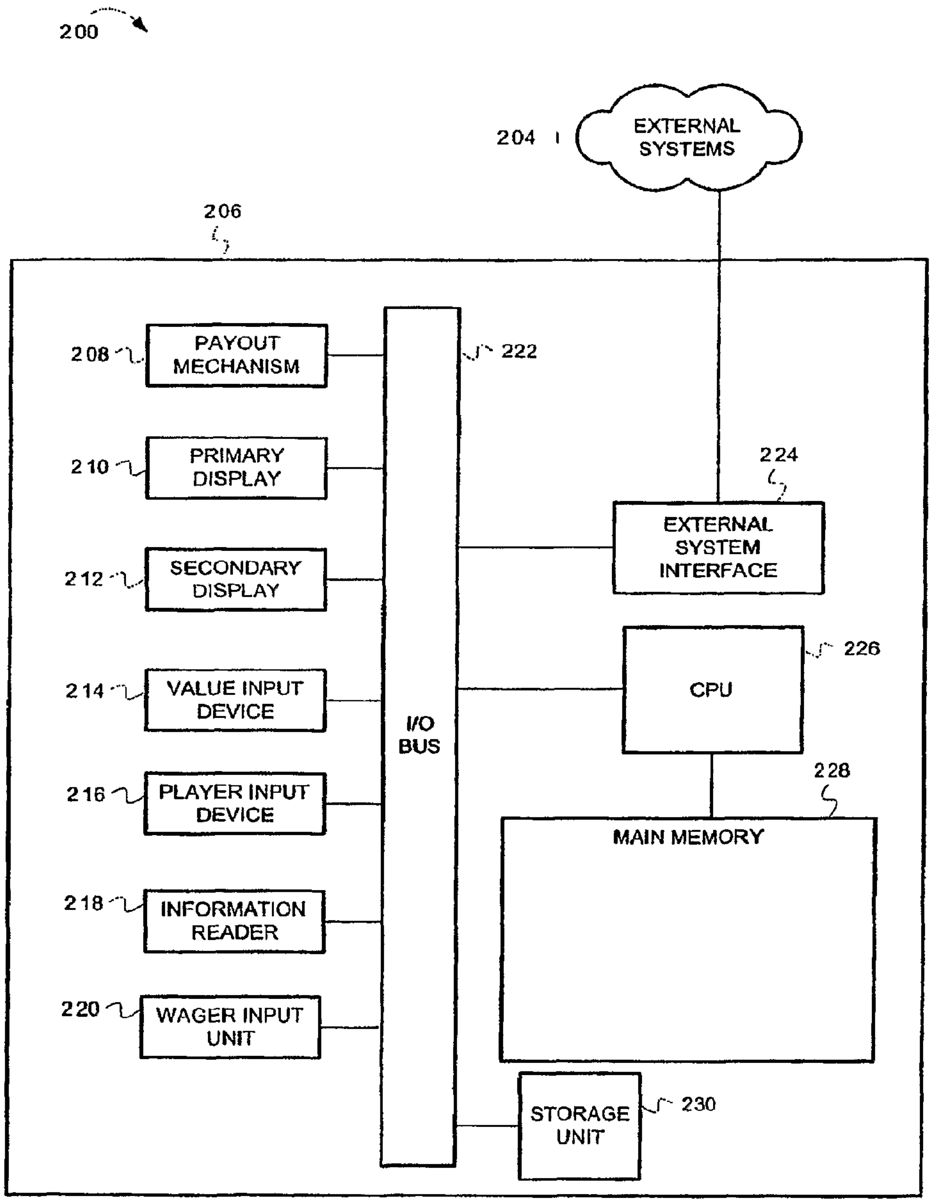
FIG. 2 is a block diagram of a control system suitable for operating the wagering game machine, according to some embodiments of the invention.

FIG. 2 is a block diagram illustrating a wagering game machine, according to some embodiments of the invention. As shown in FIG. 2, the wagering game machine 200 includes a processor 226 connected to main memory 228. In some embodiments, the wagering game machine 200 can receive wagers and conduct wagering games, such as video poker, video blackjack, video slots, video lottery, etc.

The processor 226 is also connected to an input/output (I/O) bus 222, which facilitates communication between the wagering game machine's components. The I/O bus 222 is connected to a payout mechanism 208, primary display 210, secondary display 212, value input device 214, player input device 216, information reader 218, wager input unit 220, and storage unit 230. The storage unit 230 can be a part of a hard drive, in accordance with some embodiments of the invention. As further described below, such a hard drive can be mounted onto a printed circuit board (PCB) that can include a number of the components shown in FIG. 2 (e.g., the processor 226, the main memory 228, etc.). In some embodiments, the hard drive can be installed and removed from the PCB using one or more housing brackets without the use of tools.

In one embodiment, the wager input unit 220 can electronically receive wagering value (e.g., monetary value) from a player's casino account or other suitable "cashless gaming" value source. The I/O bus 222 is also connected to an external system interface 224, which is connected to external systems 204 (e.g., wagering game networks).

In some embodiments, the wagering game machine 200 can include additional peripheral devices and/or more than one of each component shown in FIG. 2. For example, in some embodiments, the wagering game machine 200 can include external system interfaces 224 and multiple processors 226. In some embodiments, any of the components can be integrated or subdivided. Additionally, in some embodiments, the components of the wagering game machine 200 can be interconnected according to any suitable interconnection architecture (e.g., directly connected, hypercube, etc.).

In some embodiments, any of the components of the wagering game machine 200 can include hardware, firmware, and/or software for performing the operations described herein. Furthermore, any of the components can include machine-readable media including instructions for causing a machine to perform the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Hard Drive Mounts

Various embodiments of installing a hard drive into a wagering game machine without using tools are now described. Accordingly, installation and uninstallation of hard drives in wagering game machines can be performed more quicldy. In some embodiments, the installations can relate to the initial install (either during manufacturing or in the field) and additional installs after the wagering game machine has been in the operation for a time. For example, a new operating system, new game(s), etc. can be installed in the wagering game machine by swapping out the hard drives or adding a new hard drive in the wagering game machines, while the machines are still in the field.

As further described below, the hard drives can be electrically coupled to a PCB that is part of a wagering game machine. While any of a number of standards can be used, in some embodiments, the hard drives can be electrically coupled to the PCB based on the Serial Advanced Technology Attachment (SATA) standard or the Integrated Device Electronics (IDE) standard.

Hard drive mounts for mounting a hard drive within a wagering game machine, according to some embodiments, can be located in a number of locations in the wagering game machine. In some embodiments, the hard drive mounts can be housed in a logic box that can be accessed on the back side of the wagering game machine (as shown in FIG. 1B). A more detailed description of the logic box 151 (shown in FIG. 1B) is now set forth. In particular, FIG. 3 illustrates a logic box that is part of a wagering game machine, according to some embodiments of the invention. In particular, FIG. 3 illustrates a logic box 304 that holds a number of electrical components for operation of the wagering game machine. The logic box 304 includes a door 308, which after opening allows access to electrical components 302 therein. The electrical components can include a printed circuit board (PCB) that can be a multi layer flat, plate-like structure having external dimensions adapted to support attached electrical component or components. Various parts shown in FIG. 2 can be included in the logic box. For example, one or more processors, different types of memory, one or more hard drives, etc. can be mounted on the PCB. A more detailed description of various embodiments of how hard drives can be mounted on the PCB within the logic box is now set forth.

Figure 4:
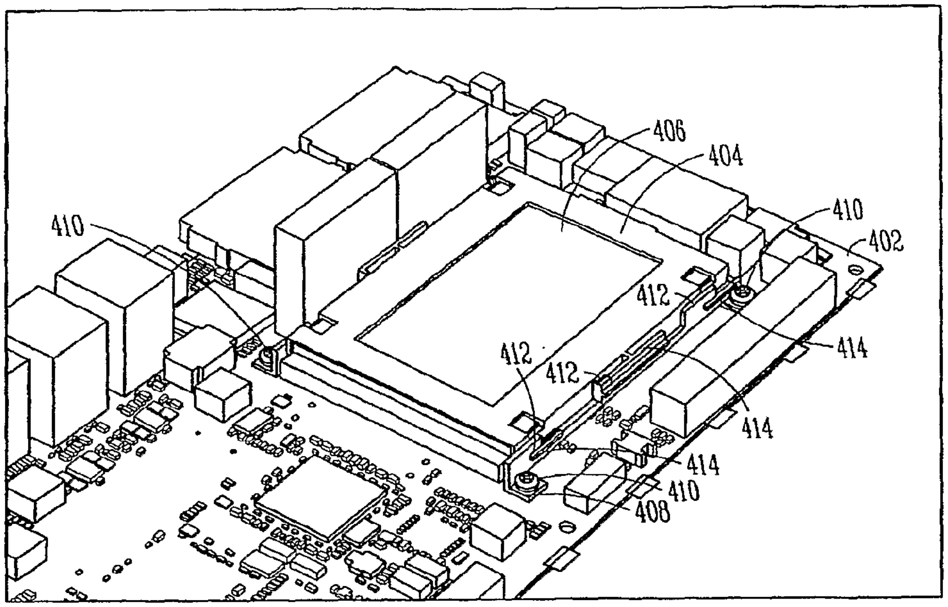
FIGS. 4-6 are various views of a hard drive mount having multiple brackets for installing the hard drive into a wagering game machine, according to some embodiments of the invention.
Figure 5:
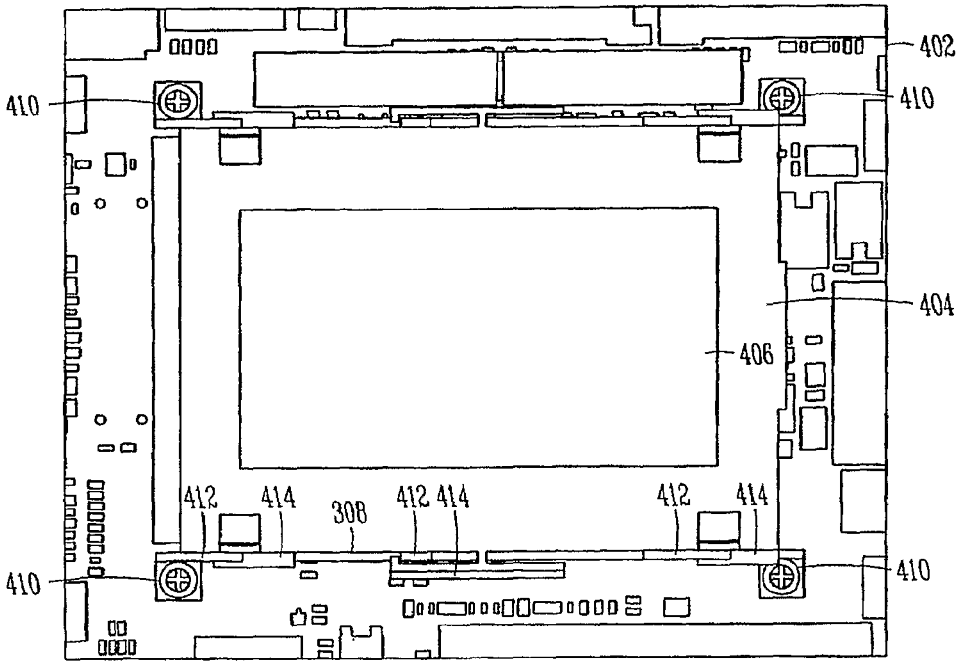
Figure 6:
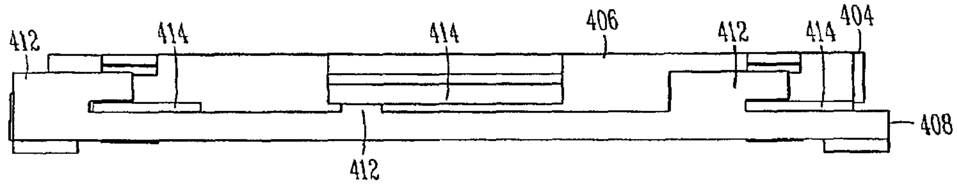

FIGS. 4-6 are various views of a hard drive mount having multiple brackets for installing the hard drive into a wagering game machine, according to some embodiments of the invention. In particular, FIGS. 4-6 are an isometric view, a top view and a side view, respectively, of the hard drive mount having multiple brackets. Rail brackets 408 are attached to a PGB 402. The rail brackets 408 are shown to be attached to the PCB 402 using a number of fasteners 410 (such as screws). The rail brackets 408 include a number of secure slide locks 412. FIG. 4 also illustrates a hard drive 406. A mounting bracket 404 is attached to the hard drive 406. The mounting bracket 404 can be attached to the hard drive 406 by snapping the mounting bracket 404 over the hard drive 406. Alternatively or in addition, the mounting bracket 404 can be attached to the hard drive 406 using one or more fasteners (not shown). The mounting bracket 404 includes a number of secure slide locks 414.

For installation, the mounting bracket 404 can be attached to the hard drive 406. The mounting bracket 404 along with the hard drive 406 can then be placed into the rail brackets 408 from above the PCB 402. The mounting bracket 404 can then be slid along the rail brackets 408 to securely attach the hard drive 406 to the PCB 402. In particular, the secure slide locks 412 and the secure slide locks 414 can be locked together (as shown). In some embodiments, the hard drive 406 can be electrically coupled to the PCB 402 using a cable (not shown). Alternatively, the hard drive 406 can be electrically coupled to the PCB 402 through a surface mount connector (not shown) that are connected to the PCB 402 during the secure attaching of the mounting bracket 404 to the rail brackets 408. An example of such a surface mount connector is described relative to the configuration shown in FIG. 8 (described in more detail below).

Figure 7:
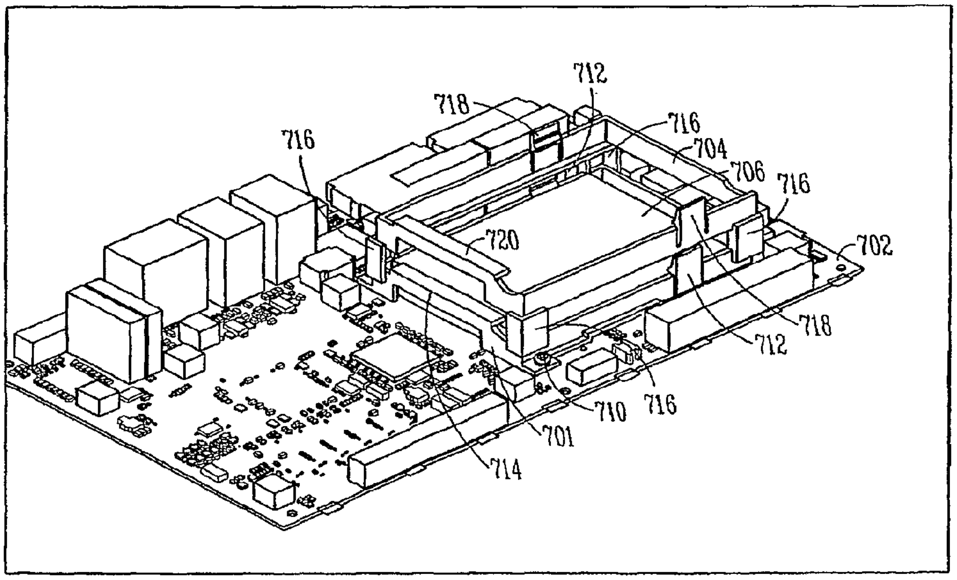
FIG. 7 is an isometric view of hard drive mounts that are stackable for installing multiple hard drives into a wagering game machine, according to some embodiments of the invention.

FIG. 7 is an isometric view of hard drive mounts that are stackable for installing multiple hard drives into a wagering game machine, according to some embodiments of the invention. A first stackable mount 701 is attached to a PCB 702. As shown, in some embodiments, the first stackable mount 701 is attached to the PCB 702 using a number of fasteners 710 (such as screws). Alternatively or in addition, the first stackable mount 701 is attached to the PCB 702 by snapping the first stackable mount 701 through apertures in the PCB 702. The first stackable mount 701 includes a number of side secure tabs 712 and a lip 714. A hard drive 706 can be installed into the first stackable mount 701 prior to mounting of a second stackable mount 704 on top. In particular, the hard drive 706 can be snapped into the side secure tabs 712 and under the lip 714.

The second stackable mount 704 includes a number of stack supports 716. The second stackable mount 704 can be snapped on top of the first stackable mount 701, using the number of stack supports 716. The second stackable mount 704 also includes a number of side secure tabs 718 and a lip 720. A hard drive (not shown) can be installed into the second stackable mount 704. In particular, such a hard drive can be snapped into the side secure tabs 718 and under the lip 720. While only showing two stackable mounts, any number of stackable mounts can be used to install hard drives into the wagering game machine.

In some embodiments, the hard drive 306 can be electrically coupled to the PCB 702 using a cable (not shown). Alternatively, the hard drive 306 can be electrically coupled to the PCB 302 through a surface mount connector (not shown) that are connected to the PCB 302 during the placement of the hard drives into the stackable mounts. An example of such a surface mount connector is described relative to the configuration shown in FIG. 8 (described in more detail below).

Figure 8:
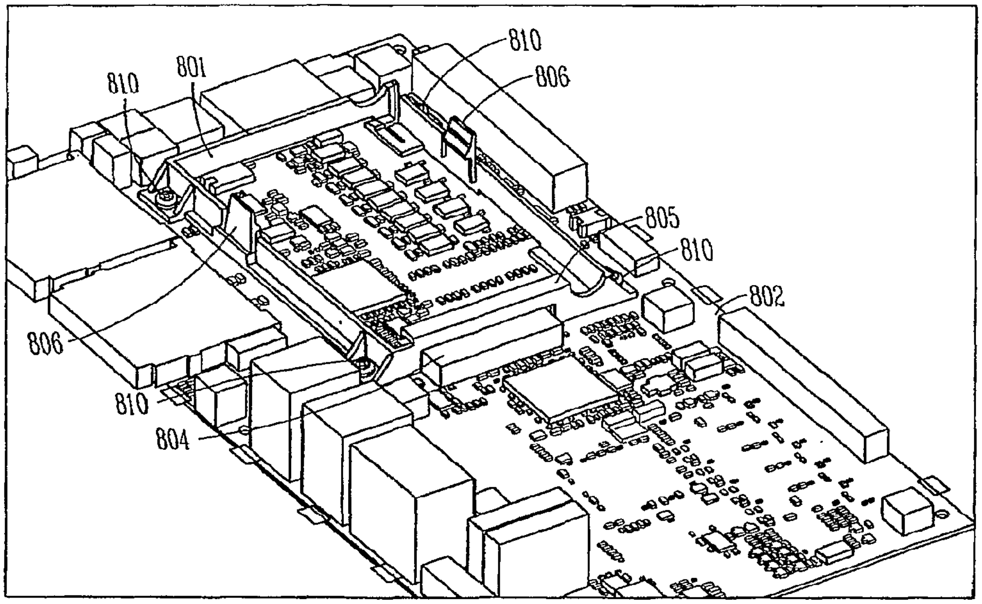
FIG. 8 is an isometric view of a hard drive mount and a surface mount connector for coupling electrical signals between the hard drive and a PCB in a wagering game machine, according to some embodiments of the invention.

FIG. 8 is an isometric view of a hard drive mount and a surface mount connector for coupling electrical signals between the hard drive and a PCB in a wagering game machine, according to some embodiments of the invention. In particular, FIG. 8 illustrates a blind mate configuration for installation of the hard drive into the wagering game machine. A hard drive mount 801 is attached to a PCB 802. The hard drive mount 801 is shown to be attached to the PCB 802 using a number of fasteners 810 (such as screws). The hard drive mount 801 includes a number of side secure tabs 806 and a lip 805. A surface mount connector 804 is attached to the PCB 802, such that after a hard drive is installed into the hard drive mount 801, the hard drive is electrically coupled to the PCB 802. In particular, such a hard drive can be snapped into the side secure tabs 806 and under the lip 805. In some embodiments, stackable mounts (similar to the configuration shown in FIG. 7) can be used to stack multiple hard drives for the configuration shown in FIG. 8. These additional hard drives can be electrically coupled to the PCB 802 through additional surface mount connectors and/or through cabling (as described above).

Figure 9:
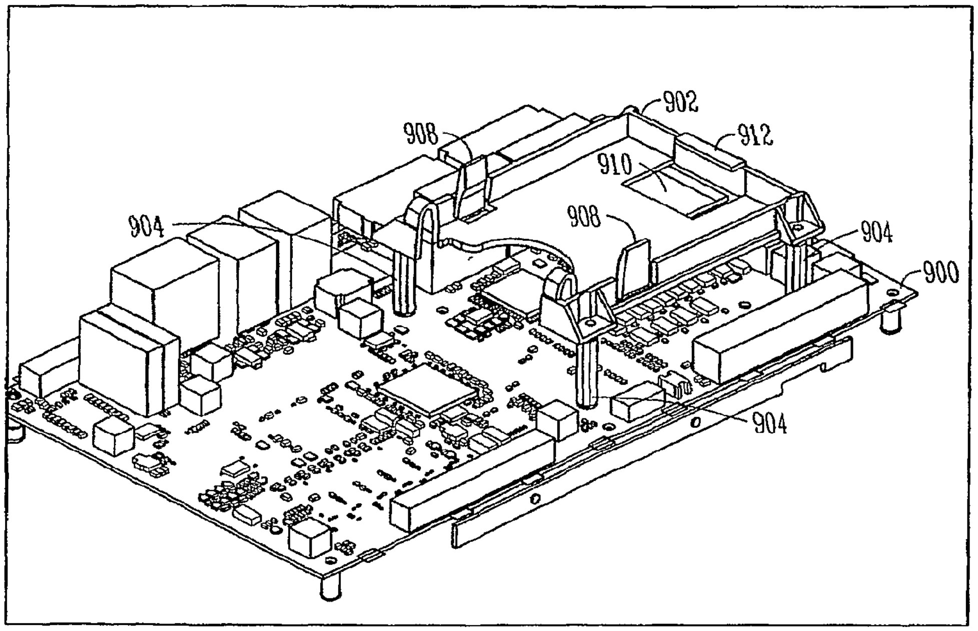
FIG. 9 is an isometric view of a hard drive mount positioned such that there is spacing between itself and the PCB in the wagering game machine, according to some embodiments of the invention.

FIG. 9 is an isometric view of a hard drive mount positioned such that there is spacing between itself and the PCB in the wagering game machine, according to some embodiments of the invention. A hard drive mount 906 is attached to a PCB 900 using a number of columns 904. The columns 904 can be any of a number of shapes, such as round, square, octagonal, etc. In some embodiments, the columns 904 are attached to the PCB 900 using fasteners (such as screws) (not shown). Alternatively or in addition, the columns 904 are attached to the PCB 900 by snapping the columns 904 through apertures in the PCB 900. The hard drive mount 906 can be attached to the columns 904 using fasteners (such as screws) (not shown). Alternatively or in addition, the columns 904 are attached to the PCB 900 by snapping the columns 904 through apertures in the hard drive mount 906. The hard drive mount 906 includes a number of side secure tabs 908, a bottom secure tab 910 and a lip 912. A hard drive (not shown) can be snapped into the side secure tabs 908 and under the lip 912 (which is secured by the bottom tab 910). In particular, the bottom tab 910 can act like a spring to tighten the hard drive against the lip 912. In some embodiments, the hard drive mount 906 is positioned at least N inches above the PCB 900. In some embodiments, N can be a variable increment in inches or metric, positive or negative, which can be infinite (such as 0 inches, 0.5 inches, 1 inch, 2 inches, 3 inches, 4 inches, 5 inches, −1 inch, etc.). In some embodiments, the hard drive mount 906 can be positioned directly on the PCB 900 with a flush mount or any increment above. In some embodiments, the position of the hard drive mount 906 above the PCB 900 is constrained by the size of the enclosure (e.g., the logic box) and the cable connector. The hard drive and the hard drive mount can be mounted in an enclosure that is separate from the logic box that houses the PCB 900.

In some embodiments, any number of mounts can be stacked on top of the mount 906 (which may or may not include columns for spacing between the hard drives). In some embodiments, the hard drive can be electrically coupled to the PCB 900 using a cable (not shown). Alternatively, the hard drive can be electrically coupled to the PCB 900 through a surface mount connector (not shown) that is connected to the PCB 900 during the placement of the hard drives into the stackable mounts. An example of such a surface mount connector is described relative to the configuration shown in FIG. 8 (described above).

Figure 10:
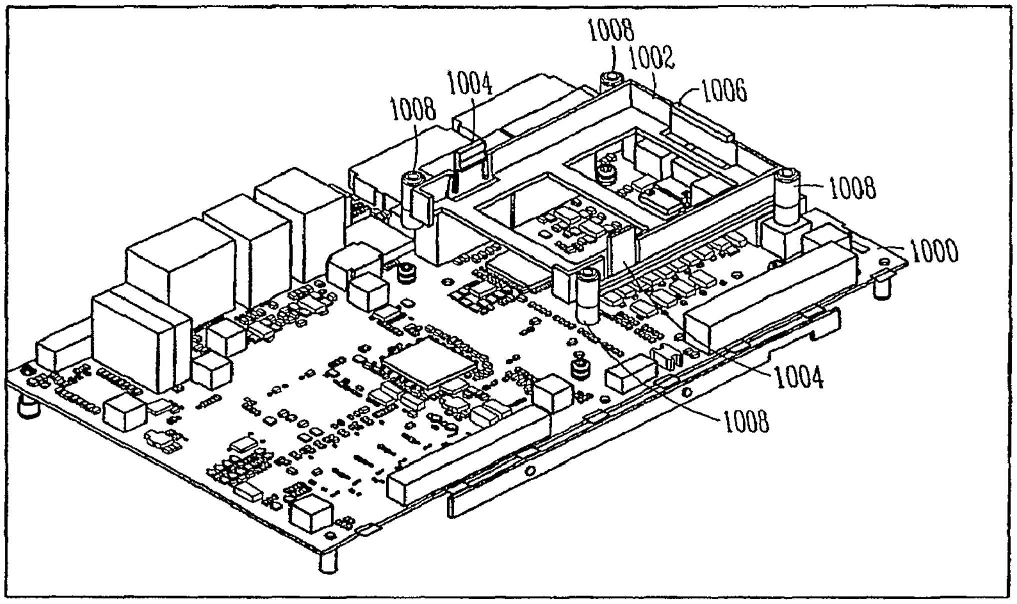
FIGS. 10 and 11 are isometric views of hard drive mounts that are stackable for installing multiple hard drives into a wagering game machine, according to some embodiments of the invention.
Figure 11:
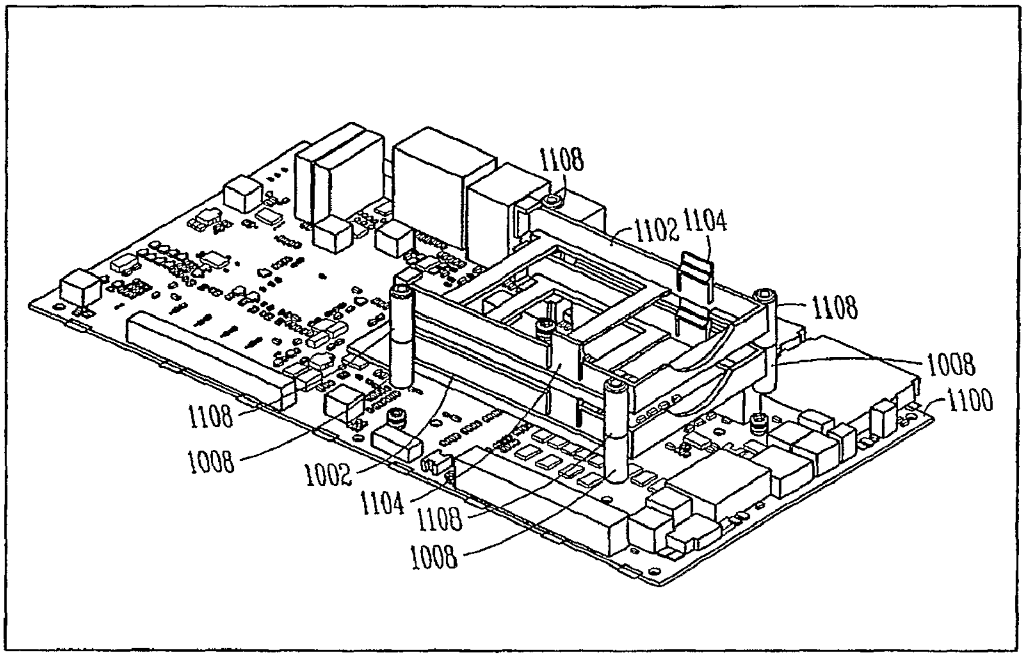

FIGS. 10 and 11 are isometric views of hard drive mounts that are stackable for installing multiple hard drives into a wagering game machine, according to some embodiments of the invention. Similar to FIG. 6, the hard drive mounts are stackable. In contrast to the configuration of FIG. 6, the configuration of FIGS. 10 and 11 provide for a same type of hard drive mount to be used (as further described below).

FIG. 10 illustrates a PCB 1000. A first stackable mount 1002 includes a number of columns 1008. The first stackable mount 1002 is attached to the PCB 1000 at the columns 1008. In some embodiments, the first stackable mount 1002 is attached to the PCB 1000 using a number of fasteners (such as screws) in columns 1008. Alternatively or in addition, the first stackable mount 1002 is attached to the PCB 1000 by snapping the columns 1008 through apertures in the PCB 1000. The first stackable mount 1002 includes a number of side secure tabs 1004 and a lip 1006. A hard drive can be installed into the first stackable mount 1002 by snapping the hard drive past the side secure tabs 1004 and under the lip 1006.

FIG. 11 is an isometric view of the configuration of FIG. 10 with a second stackable mount 1102 mounted on top of the first stackable mount 1002. The second stackable mount 1102 includes a number of columns 1108. The columns 1108 are mounted on top of the columns 1008. The columns 1108 can be snapped on top of the columns 1008. Alternatively or in addition, the columns 1108 can be secured to the columns 1008 using a number of fasteners (such as screws). The second stackable mount 1102 includes a number of side secure tabs 1104 and a lip 1106. A hard drive can be installed into the second stackable mount 1102 by snapping the hard drive into the side secure tabs 1104 and under the lip 1106. While only showing two stackable mounts, any number of stackable mounts can be used to install hard drives into the wagering game machine.

In some embodiments, the hard drives can be electrically coupled to the PCB 1000 using a cable (not shown). Alternatively, the hard drives can be electrically coupled to the PCB 1000 through surface mount connectors (not shown) that are connected to the PCB 1000 during the placement of the hard drives into the stackable mounts. An example of such a surface mount connector is described relative to the configuration shown in FIG. 8 (described above). As shown in FIG. 11, a same mount (1002 and 1102) can be manufactured from essentially a same manufacturing mold, thereby potentially reducing the manufacturing costs associated with such embodiments.

Figure 12:
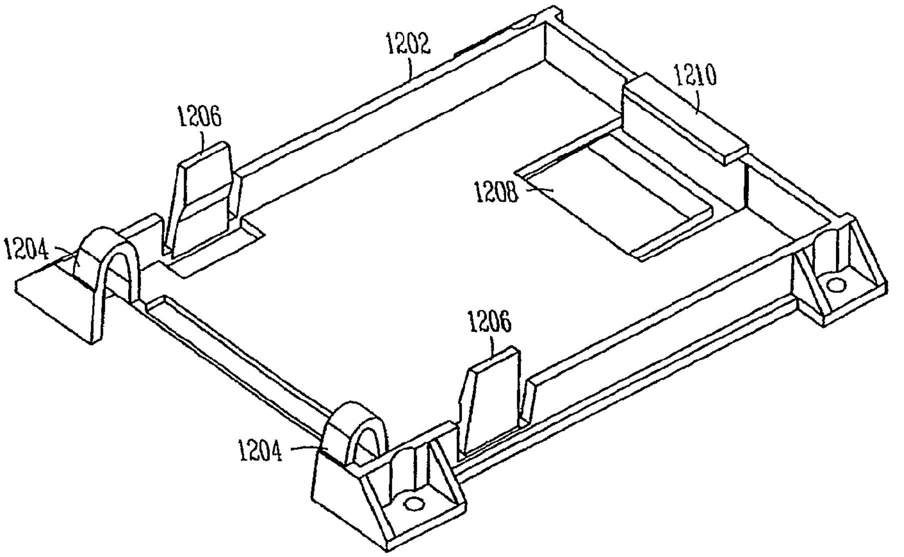
FIGS. 12 and 13 are isometric views of hard drive mounts for installing hard drives into a wagering game machine, according to some embodiments of the invention.
Figure 13:
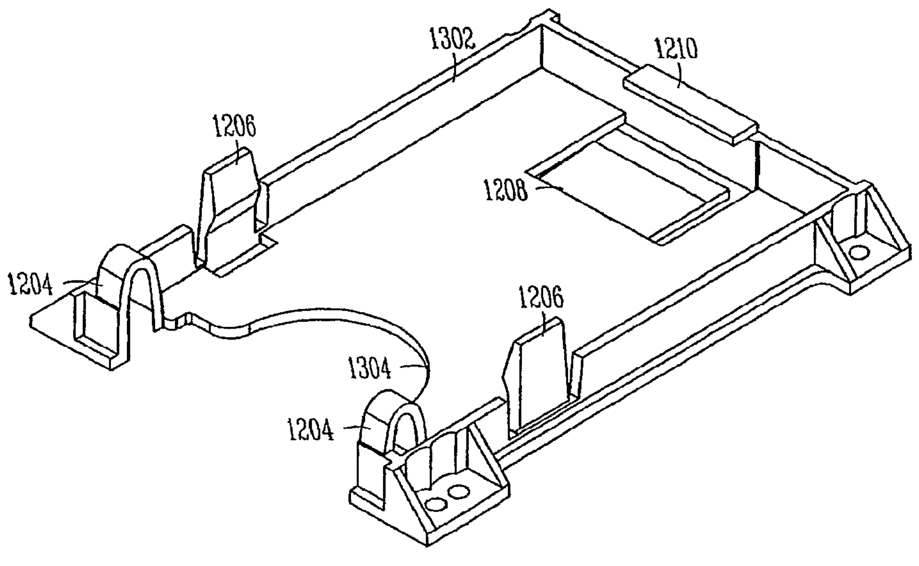

FIGS. 12-13 are isometric views of hard drive mounts for installing hard drives into a wagering game machine, according to some embodiments of the invention. In particular, FIGS. 12 and 13 can be used in the configurations shown in FIGS. 4-11 (described above) or FIG. 14-16 (described below). FIGS. 12-13 illustrate a hard drive mount 1202/1302 that includes side secure tabs 1206A-1206B, a bottom secure tab 1208, a lip 1210 and arches 1204A-1204B. The side secure tabs 1206A-1206B, the bottom secure tab 1208, the lip 1210 and the arches 1204A-1204B secure the hard drive into the hard drive mount 1202/1302. In particular, the hard drive (not shown) can be snapped into the side secure tabs 1206A-1206B and under the lip 1210 (which is secured by the bottom tab 1208). In particular, the bottom tab 1210 can act like a spring to tighten the hard drive against the lip 1212. Furthermore, the arches 1204A-1204B secure the hard drive by providing tension toward the lip 1212. The hard drive mount 1302 in FIG. 13 also includes a bottom aperture 1304. The bottom aperture 1304 enables an installer of the hard drive to more easily remove the hard drive. Specifically, the bottom aperture 1304 enables the installer to place their fingers underneath the hard drive (below the hard drive mount 1302) to lift the hard drive out from the mount.

Figure 14:
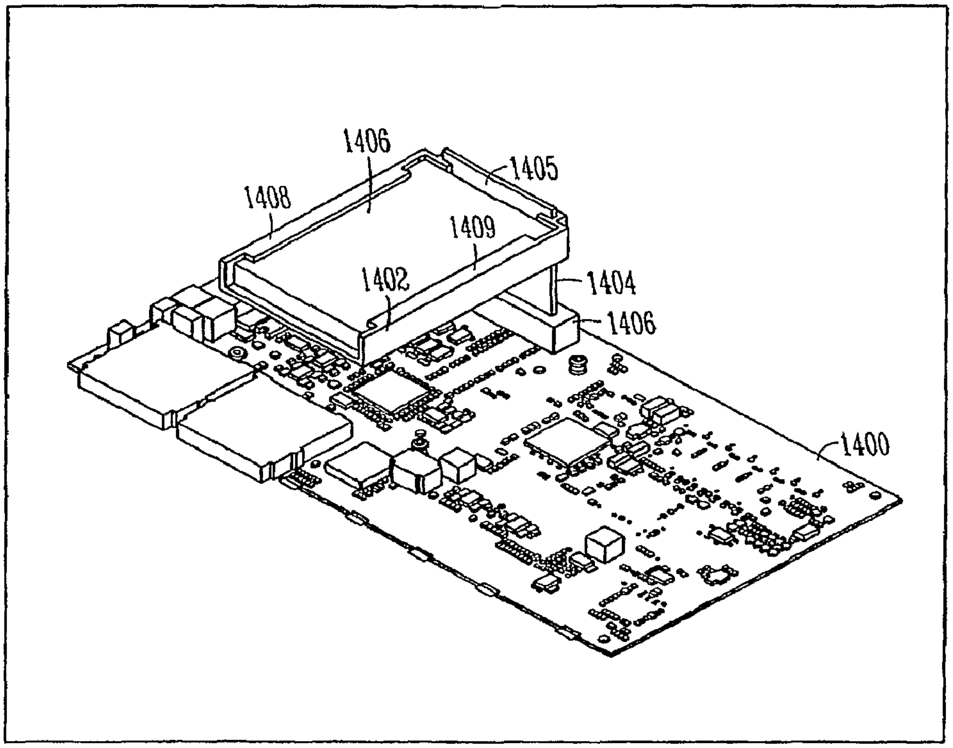
FIGS. 14-16 are various views of a hard drive mount that is blind mateable for installing a hard drive into a wagering game machine, according to some embodiments of the invention.
Figure 15:
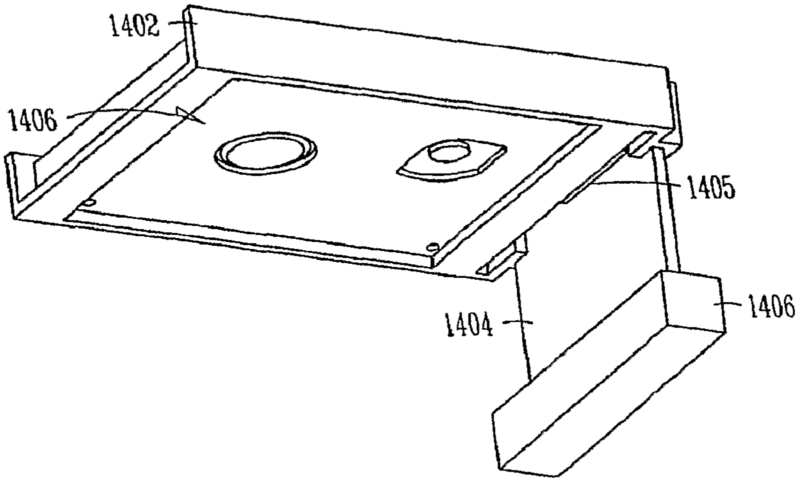
Figure 16:
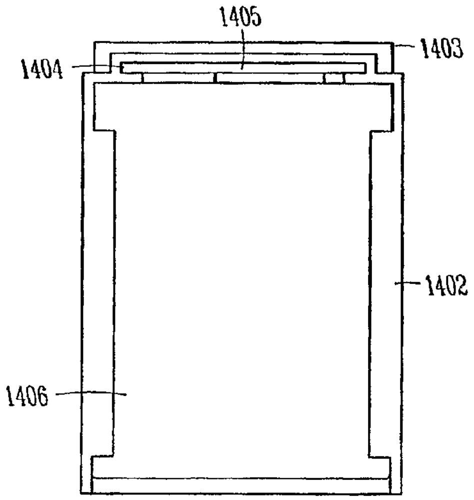

FIGS. 14-16 illustrate some embodiments of hard drive mounts that allow a hard drive to be installed through a blind mate connection, according to some embodiments of the invention. In some embodiments, the configurations shown in FIGS. 14-16 enable a logic box (that houses the PCB and is part of the wagering game machine) to not be removed/detached from the machine to install hard drives therein. Returning to FIG. 3 to illustrate, the door 308 of the logic box 304 may be opened and the hard drive installed into a hard drive mount, while the logic box 304 is still within the wagering game machine. In some embodiments, the hard drive may be hot swapped. Therefore, the wagering game machines does not need to be powered down and/or allowing the wagering game machine to continue operations.

FIGS. 14-16 are various views of a hard drive mount that is blind mateable for installing a hard drive into a wagering game machine, according to some embodiments of the invention. In particular, FIGS. 14-16 are a top angle isometric view, a bottom angle isometric view and a top view, respectively, of the hard drive mount that allows for blind mating of a hard drive therein. A surface mount connector 1406 is electrically attached to a PCB 1400. A board 1404 is electrically attached to the surface mount connector 1406. The board 1404 includes a blind mate connector 1405 that is located at an opposite end of the side attached to the surface mount connector 1406. A hard drive mount 1402 includes a rail 1408 and a rail 1409 that serves as guides for mounting a hard drive 1406 into the hard drive mount 1402. As the hard drive 1406 is mounted into the hard drive mount 1402 along the rails 1408 and 1409, the hard drive 1406 is electrically coupled to the board 104 through the blind mate connector 1405.

In some embodiments, the hard drive mount 1402 is positioned at least N inches above the PCB 1400. In some embodiments, N can be a variable increment in inches or metric, positive or negative, which can be infinite (such as 0 inches, 0.5 inches, 1 inch, 2 inches, 3 inches, 4 inches, 5 inches, −1 inch, etc.). In some embodiments, the hard drive mount 1402 may be rotated to different angles relative to the PCB 1400. For example, the bard drive mount 1402 can be rotated approximately 90 degrees, such that the hard drive mount 1402 is essentially perpendicular to the PCB 1400. In some embodiments, hard drive mounts can be stackable. In such embodiments, the hard drive mounts can have separate electrically connections to the PCB 1400. For example, for each hard drive, there can be a separate surface mount connector, board and hard drive mount.

While described such that the blind mate connection is to a PCB, some embodiments are not so limited. For example, in some embodiments, the blind mate connection can be to a cable. As described, some embodiments of the configurations illustrated in FIGS. 4-16 do not require the use of a fastener to attach a hard drive to a hard drive mount. Accordingly, the mounting and unmounting of the hard drives into the wagering game machines can occur more quickly. While described such that the hard drives and hard drive mounts are within a logic box that are part of the wagering game machine, some embodiments are not so limited. In particular, the hard drives and hard drive mounts may be positioned external to the logic box. For example, the hard drives and hard drive mounts may be positioned within other locations that are part of the wagering game machine. Some type of connection (such as a cable) may electrically couple the hard drive to the PCB. In some embodiments, one or more shipping fasteners may be used to couple the hard drive to the hard drive mount. Such fasteners may be subsequently removed after the wagering game machine is in the field. For example, as part of the initial set up, such fasteners may be removed.

General Comments

In the following detailed description, reference is made to specific examples by way of drawings and illustrations. These examples are described in sufficient detail to enable those skilled in the art to practice the inventive subject matter, and serve to illustrate how the inventive subject matter may be applied to various purposes or embodiments. Other embodiments are included within the inventive subject matter, as logical, mechanical, electrical, and other changes may be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. The following detailed description does not, therefore, limit embodiments of the invention, which are defined only by the appended claims.

Each of the embodiments described herein are contemplated as falling within the inventive subject matter, which is set forth in the following claims.

What is claimed is:

1. An apparatus comprising:

a printed circuit board that is part of a wagering game machine, wherein the printed circuit board includes a processor operable to execute instructions associated with a wagering game; and a hard drive mount that is coupled to the printed circuit board, wherein the hard drive mount includes an alignment guide and a blind mate connector for electrically coupling a hard drive to a surface mount connection on the printed circuit board, the hard drive to store wagering game data for the wagering game, and the hard drive mount enabling full placement of the hard drive within the hard drive mount;

wherein the alignment guide includes at least two opposing sides around at least part of an opening to receive the hard drive, the at least two opposing sides guiding the hard drive to a central position of the opening upon an installation of the hard drive into the hard drive mount, and wherein the alignment guide includes at least one tab on each of the opposing sides, the at least one tab arranged in each opposing side of the alignment guide to secure the hard drive in the hard drive mount upon the full placement of the hard drive within the hard drive mount; and wherein the alignment guide and the blind mate connector are arranged such that the installation of the hard drive into the hard drive mount causes connection of the hard drive with the blind mate connector.

2. The apparatus of claim 1, wherein the printed circuit board is housed in a logic box that is part of the wagering game machine, and wherein the hard drive is to be mounted onto the hard drive mount while the logic box remains attached to the wagering game machine.

3. The apparatus of claim 1, wherein the hard drive is mounted to the hard drive mount without a fastener.

4. The apparatus of claim 1, wherein a bottom of the hard drive mount includes an aperture along a side that is opposite a side that includes the blind mate connector.

5. The apparatus of claim 1, wherein the alignment guide comprises a first rail and a second rail to guide the coupling of the hard drive to the surface mount connection.

6. The apparatus of claim 1, wherein the hard drive is mounted to the hard drive mount without a tool.

7. The apparatus of claim 1, further comprising one or more columns used to couple the hard drive mount to the printed circuit board, wherein the one or more columns are positioned to provide spacing between the hard drive mount and the printed circuit board in the wagering game machine.

8. The apparatus of claim 1, wherein the hard drive mount further includes a board providing the blind mate connector, wherein the board is electrically coupled to a surface mount connector of the printed circuit board, and wherein the hard drive is electrically coupled to the board through the blind mate connector.

9. The apparatus of claim 1, further comprising a Serial Advanced Technology Attachment standard cable, a first end of the Serial Advanced Technology Attachment standard cable being coupled to the blind mate connector of the hard drive mount.

10. An apparatus comprising:

a printed circuit board to support a number of electrical components associated with a wagering game;

a first hard drive mount to mount a first hard drive onto the printed circuit board, the first hard drive mount attached to the printed circuit board at a number of apertures in the printed circuit board; and a second hard drive mount to mount a second hard drive onto the printed circuit board, the second hard drive mount stackably attached to a top of the first hard drive mount at locations on the first hard drive mount that are attached at the number of apertures in the printed circuit board;

wherein the first hard drive mount and the second hard drive mount include a respective alignment guide and a respective blind mate connector arranged such that installation of a respective hard drive causes connection with the respective blind mate connector;

wherein each alignment guide includes at least two opposing sides around at least part of an opening to receive the respective hard drive, the at least two opposing sides guiding the respective hard drive to a central position of the opening upon an installation of the respective hard drive, and wherein each alignment guide includes at least one tab on each of the opposing sides, the at least one tab arranged in each opposing side of each alignment guide to secure the respective hard drive in the hard drive mount upon the full placement of the respective hard drive within the hard drive mount; and wherein the respective blind mate connector facilitates an electrical connection between the respective hard drive and the printed circuit board upon installation of the respective hard drive.

11. The apparatus of claim 10, wherein the first hard drive is capable of installation into the first hard drive mount without a fastener or a tool.

12. The apparatus of claim 10, wherein the first hard drive mount and the second hard drive mount are manufactured from essentially a same manufacturing mold.

13. The apparatus of claim 10, further comprising a number of fasteners configured to interface with the apertures to secure the first hard drive mount to the printed circuit board.

14. The apparatus of claim 13, wherein the second hard drive is electrically coupled to the printed circuit board through an electrical cable.

15. The apparatus of claim 10, wherein the first hard drive is electrically coupled to the printed circuit board through a surface mount connection.

16. The apparatus of claim 10, wherein the first hard drive mount comprises a number of side secure tabs, a lip and a bottom secure tab to secure the hard drive within the first hard drive mount.

17. A system comprising:

a printed circuit board to which rail brackets are attached, each of the rail brackets including a number of secure slide locks;

a mounting bracket that houses a hard drive and includes a number of secure slide locks, wherein the number of secure slide locks of the mounting bracket are locked into the secure slide locks of the rail brackets;

a blind mate connector that provides access to an electrical connection with the printed circuit board, the blind mate connector arranged such that installation of the hard drive into the mounting bracket using the secure slide locks causes connection of the hard drive with the blind mate connector; and a processor electrically coupled to the printed circuit board and operable to execute instructions associated with a wagering game, at least some of the instructions retrieved from the hard drive using the electrical connection established from the blind mate connector;

wherein the rail brackets define at least part of an opening to receive the hard drive, the rail brackets guiding the hard drive to a central position of the opening upon the installation of the hard drive, and wherein the secure slide locks of the rail brackets secure the hard drive with the secure slide locks of the mounting bracket upon full placement of the hard drive within the opening.

18. The system of claim 17, further comprising a cable to electrically couple the hard drive to the printed circuit board, wherein the blind mate connector facilitates the electrical connection using the cable.

19. The system of claim 18, wherein a communication through the cable and to the hard drive is based on the Serial Advanced Technology Attachment standard.

20. The system of claim 17, wherein the mounting bracket is secured to the rail brackets without a fastener.

21. A method comprising:

opening a door of a logic box that remains attached to a wagering game machine, the logic box housing a printed circuit board, wherein a hard drive mount is attached to the printed circuit board, the hard drive mount having a railing and a blind mate connector; and mounting a hard drive into the hard drive mount, wherein the hard drive is electrically coupled to the printed circuit board through the blind mate connector;

wherein the railing is positioned around at least part of an opening to receive the hard drive and is configured to guide the hard drive to a central position of the opening upon an installation of the hard drive, wherein the railing includes at least one tab arranged to secure the hard drive in the hard drive mount upon the full placement of the hard drive within the hard drive mount;

and wherein a placement of the hard drive caused by mounting the hard drive within the hard drive mount establishes an electrical connection of the hard drive using the blind mate connector.

22. The method of claim 21, wherein mounting the hard drive into the hard drive mount comprises mounting the hard drive into the hard drive mount in a hot swap operation.

23. The method of claim 21, wherein mounting the hard drive into the hard drive mount comprises mounting the hard drive into the hard drive mount without a fastener.

* * * * *

UNITED STATES PATENT AND TRADEMARK OFFICE
CERTIFICATE OF CORRECTION

PATENT NO. : 8,348,769 B2
APPLICATION NO. : 12/293117
DATED : January 8, 2013
INVENTOR(S) : Greenberg et al.

It is certified that error appears in the above-identified patent and that said Letters Patent is hereby corrected as shown below:

In the Specification

In column 3, line 15, after “poker,”, delete “blackjack”, therefor

In column 5, line 25, delete “quicldy” and insert --quickly--, therefor

In column 6, line 1, delete “PGB” and insert --PCB--, therefor

In column 9, line 34, delete “bard” and insert --hard--, therefor

Signed and Sealed this
Eighteenth Day of June, 2013

Teresa Stanek Rea
*Acting Director of the United States Patent and Trademark Office*